Sept. 1, 1970                  B. SANN                3,526,298

PISTON-CYLINDER ASSEMBLY FOR HYDRAULIC PUMP/MOTOR APPARATUS

Filed Feb. 26, 1968

INVENTOR
Bernhard Sann
BY

United States Patent Office 3,526,298
Patented Sept. 1, 1970

3,526,298
PISTON-CYLINDER ASSEMBLY FOR HYDRAULIC PUMP/MOTOR APPARATUS
Bernhard Sann, Aachen, Germany, assignor to Gewerkschaft Eisenhuette Westfalia, a corporation of Germany
Filed Feb. 26, 1968, Ser. No. 708,138
Claims priority, application Germany, May 23, 1967, G 50,160
Int. Cl. F01m 1/04
U.S. Cl. 184—6       5 Claims

ABSTRACT OF THE DISCLOSURE

An improved piston-cylinder-connecting rod assembly for an hydraulic actuator having bore means in the piston communicating between the piston rings and a source of lubricant therefor, preferably between the piston rings and the working face of the piston.

---

Figure 1:
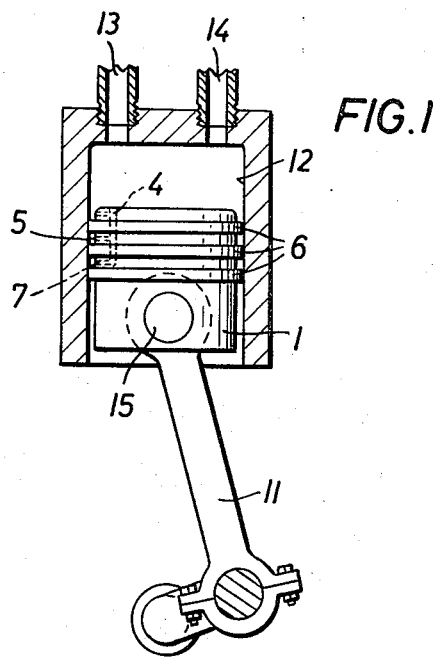

This invention relates to reversible hydraulic pumps. It more particularly refers to reciprocating piston type of hydraulic pump.

Hydraulic pumps are known which employ a piston in a cylinder connected by a connecting rod to a crank shaft. This machine may be operated as a pump by turning the crankshaft whereby reciprocating the piston; or as a motor by reciprocating the piston whereby turning the crankshaft.

In the reversal of rotation of hydraulic pump/motors of the kind employing a crankshaft and connecting rod as described above, very high friction forces occur which under some circumstances can be sufficiently high to prevent the machine from restarting in the reversed direction or at least to delay the start of the machine in the reverse direction until a substantially increased torque or pressure is supplied to the machine. Such friction forces occur between the sliding surface of the piston and cylinder at positions between top dead centre and bottom dead centre of the connecting rod-crankshaft juncture due to the lateral forces exerted on the piston against the cylinder by reason of the inclined position of the connecting rod. These forces between the cylinder and piston are generally in the plane of lateral movement of the connecting rod. When the machine is running slowly or comes to a stop, this force between the cylinder and piston causes a breakdown in the lubricant film between the piston and cylinder. Thus the frictional force is at a maximum when the machine is stationary under load. The lubricant film is at its thinnest under these conditions and may in fact possibly be entirely missing. This extreme condition of completely dry friction, i.e., no lubricant at all, is unlikely to occur but in many cases the situation will approach that of dry friction.

It is therefore an object of this invention to provide an improved piston-cylinder-connecting rod assembly for use in connection with hydraulic pumps.

It is another object of this invention to provide a piston for such an hydraulic pump which is not subject to the difficiencies of the prior art.

Other and additional objects of this invention will become apparent from a consideration of this entire specification including the claims and drawing hereof.

In accord with and fulfilling these objects, one aspect of this invention includes providing fluid communicating means between the rings of the piston and source of lubrication which is under pressure.

According to the invention, there is provided a reversable hydraulic pump/motor in which a piston, which is reciprocatable within a cylinder, is connected through a connecting rod to a crank and in which there is a supply for lubricant under pressure to the sliding surface of the piston with the cylinder, in the plane of movement of the connecting rod.

The lubricant may be the hydraulic fluid being pumped by the pump/motor.

A series of tests which have been performed will now be described to indicate the nature and effect of the friction forces with which the invention is concerned.

To prove the high friction during reversal of a hydraulic pump/motor, a radial machine operating as a pump was stalled with an output pressure of 140 kg./sq. cm. The input torque on the shaft was maintained constant while at the same time the pressure in the working cylinder was increased by means of another supply to the pump output. Despite an increase in the pressure of 110 kg./sq. cm. the machine did not start to run in the reverse direction, that is to say the pump did not become a motor. The torque applied to the shaft of the machine remained constant throughout this test.

In preparation for a further test, a blind hole was drilled into the piston from its crown surface and lateral drillings were made to connect the first drilling with the peripheral surface of the piston between the piston rings in the plane of movement of the connecting rod. The original test was then repeated with the machine modified in this way. The result was that the machine started to run in the reversed direction, that is as a motor, when the pressure in the cylinder reached about 180 kg./sq. cm.; this represents a pressure increase of 40 kg./sq. cm.

It appears that, by reason of the supply of fluid under pressure from the working chamber of the machine to the surface of the piston where the friction is at its greatest, the frictional force is relieved by the hydrostatic pressure of the fluid supplied and is thus substantially reduced.

To prove that the test result was not based upon a chance occurrence, a five-cylinder pump was provided with such bores in two of its pistons. Since two pistons are always effective in this particular machine, the following three possibilities exist:

(1) Both drilled pistons are on a working stroke: 2
(2) Only one drilled piston is on a working stroke: 1
(3) No drilled piston is on a working stroke:     0

In frequently repeated tests it appeared that reversal of rotation was possible only when at least one of the two drilled pistons was on a working stroke (at 180 kg./sq. cm. after a 140 kg./sq. cm. stall) otherwise a reversal of rotation could not be achieved.

This proves that the great influence of the friction between the cylinder and piston is during starting under load or in reversing into the opposite direction of rotation under load. This would appear to be particularly so in slow-running machines.

In practice, the hydrostatic relief of the pistons increases the leakage oil flow, so that a reduction of the volumetric efficiency $\eta v$ occurs. On the other hand, however, it is only a question of quantitative experiments —where the important points are the number, the diameter and the position of the bores—in order to find the optimum between the deterioration of the volumetric efficiency $\eta v$ and the improvement of the hydraulic-mechanical efficiency $\eta$.

Figure 2:
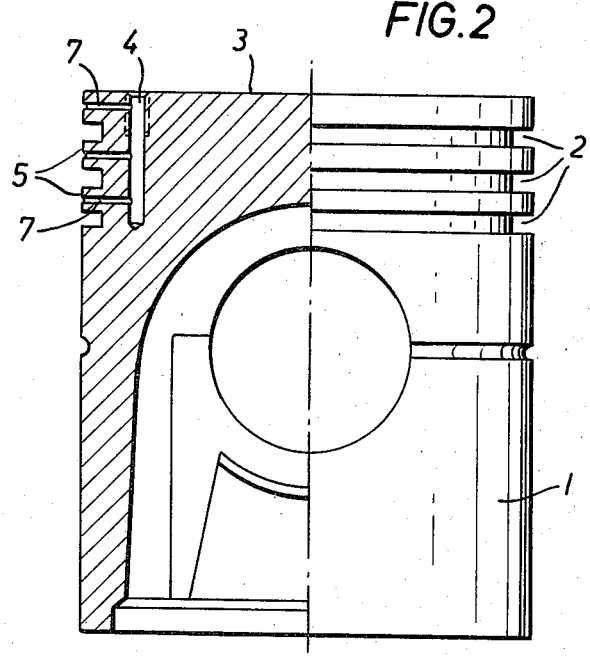

An embodiment of the invention will now be decsribed by way of example with reference to the accompanying drawings in which:

FIG. 1 is a side elevation partly in section of part of a hydraulic pump/motor incorporating the invention; and FIG. 2 is a side elevation, partly in section showing the piston of FIG. 1 on a larger scale.

A reciprocating hydraulic pump/motor comprises a crank (not shown) a connecting rod 11 connected to the crank, a reciprocating piston 1 slidable in a cylinder bore 12 and valve controlled inlet and outlet ports 13 and 14. Either port 13 or 14 may be the inlet, dependent on the direction of rotation. The valves (not shown) which control the opening and closing of the ports 13 and 14 may take any convenient form.

The piston 1 is connected to the connecting rod 11 by means of a conventional gudgeon or other type pin 15. The piston has a series of ring grooves 2 (FIG. 2) extending around the sliding surface of the piston in the cylinder bore near the crown surface 3 of the piston. FIG. 1 shows a series of piston rings 6 positioned in the ring grooves in the conventional way.

A passage 4 is drilled downwardly from the crown surface 3 of the piston in the plane of movement of the connecting rod 11 and near to the side of the piston. A series of cross passages 7 are drilled from the outer surface of the piston to communicate with the passage 4. These cross passages are drilled through shoulders 5 which are formed between the ring grooves 2.

If the valve arrangement is such that the machine can operate in only one direction of rotation as a pump and only in the opposite direction of rotation as a motor, the high friction force between the piston 1 and cylinder bore 12 occurs always at one particular side of the piston. The bores 4 and 7 should of course be incorporated in this particular side of the piston. On the other hand, if the valve arrangement is such that the device can operate in either direction of rotation as a motor and similarly in either direction of rotation as a pump, then bores corresponding to the bores 4 and 7 should be incorporated on both sides of the piston, in the plane of movement of the connecting rod.

The operation of the embodiment described with reference to the drawings corresponds to the operation as described above with reference to a series of tests.

It is desirable that the fluid supplied to the sliding surface of the piston with the cylinder in the plane of movement of the connecting rod should have good lubrication properties. This presents no problems when the working fluid of the pump/motor is a fluid which has good lubrication properties. However, it may be convenient in some circumstances, particularly if the working fluid does not have particularly good lubrication properties to supply the fluid under pressure to the sliding surface of the piston with the cylinder from some outside source. For example, this fluid could be supplied from a source of general lubrication for the remainder of the machine, possibly through a hollow connecting rod and from there through a series of bores to the appropriate surface of the piston.

What is claimed is:

1. In a reversible hydraulic pump/motor comprising a reciprocating piston inside a cylinder radially connected via a connecting rod to a crankshaft by means of a joint, which reciprocation is in the plane of movement of said connecting rod-crankshaft joint; the improvement which comprises providing channel means communicating between the working face of said piston and the sliding surface between said piston and said cylinder along the plane of movement of said connecting rod-crankshaft joint, which communicating means is adapted to carry hydraulic fluid liquid lubricant between said piston working face and said sliding surface between said piston and said cylinder.

2. The improved pump/motor claimed in claim 1 wherein said communicating means comprises a bore channel in said piston.

3. The improved pump/motor claimed in claim 1 wherein said communicating means communicates with at least one ring groove of said piston.

4. The improved pump/motor claimed in claim 1 wherein said communicating means communicates with at least one ring groove of said piston.

5. The improved pump/motor claimed in claim 1 wherein said communicating means communicates between at least one ring groove of said piston, through said piston and through said connecting rod to said source of hydraulic fluid under pressure.

References Cited

UNITED STATES PATENTS

| 2,968,287 | 1/1961 | Creighton | 184—6 XR |
| 3,272,092 | 9/1966 | Vielmo et al. | 184—6 XR |

FOREIGN PATENTS

| 432,949 | 8/1926 | Germany. |
| 1,068,509 | 4/1958 | Germany. |

MANUEL A. ANTONAKAS, Primary Examiner

U.S. Cl. X.R.

92—157